United States Patent
Moosmann et al.

(10) Patent No.: US 11,600,938 B2
(45) Date of Patent: Mar. 7, 2023

(54) BRIDGE ELEMENT FOR ESTABLISHING AN ELECTRICAL CONNECTION, AND ARRANGEMENT

(71) Applicant: ZF Friedrichshafen AG, Friedrichshafen (DE)

(72) Inventors: Markus Moosmann, Grünkraut (DE); Florian Pawlak, Friedrichshafen (DE); Tobias Nusser, Friedrichshafen (DE); Karlheinz Mayr, Bregenz (AT); Thilo Schmidt, Meckenbeuren (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 89 days.

(21) Appl. No.: 16/980,729

(22) PCT Filed: Feb. 15, 2019

(86) PCT No.: PCT/EP2019/053774
§ 371 (c)(1),
(2) Date: Sep. 14, 2020

(87) PCT Pub. No.: WO2019/174854
PCT Pub. Date: Sep. 19, 2019

(65) Prior Publication Data
US 2021/0028564 A1    Jan. 28, 2021

(30) Foreign Application Priority Data
Mar. 15, 2018 (DE) .................... 10 2018 203 970.4

(51) Int. Cl.
*H01R 12/71* (2011.01)
*H01R 12/70* (2011.01)
(Continued)

(52) U.S. Cl.
CPC ..... *H01R 12/7076* (2013.01); *H01R 12/7023* (2013.01); *H01R 12/7064* (2013.01);
(Continued)

(58) Field of Classification Search
CPC ............ H01R 12/7076; H01R 12/7023; H01R 12/7064; H01R 12/7082; H01R 12/714;
(Continued)

(56) References Cited

U.S. PATENT DOCUMENTS 5,634,810 A    6/1997 Niitsu et al.
5,775,937 A *  7/1998 Bricaud ............. H01R 13/7035
                                                 200/51 R
(Continued)

FOREIGN PATENT DOCUMENTS

DE           10337197 A1    3/2005
DE        102009046618 A1   5/2011
(Continued)

OTHER PUBLICATIONS

Internationl Search Report (English Translation) PCT/EP2019/053774, dated Mar. 14, 2019. (2 pages).
(Continued)

*Primary Examiner* — Abdullah A Riyami
*Assistant Examiner* — Nelson R. Burgos-Guntin
(74) *Attorney, Agent, or Firm* — Dority & Manning, P.A.

(57) ABSTRACT

A bridge element (3) for establishing an electrical connection and at least one mechanical connection between an actuator (1) and a bridge element (3) for a transmission control unit of a transmission includes first electrical contacts (5a, 6a) and second electrical contacts (5b, 6b), which are connected to the first electrical contacts (5a, 6a) with electrical conductors (5, 6), and at least first mechanical connecting elements (7, 8) proximate the first electrical contacts (5a, 6a).

21 Claims, 11 Drawing Sheets

(51) Int. Cl.
  *H01R 13/405*  (2006.01)
  *H01R 13/502*  (2006.01)
  *H01R 13/52*  (2006.01)
(52) U.S. Cl.
  CPC ....... *H01R 12/7082* (2013.01); *H01R 12/714* (2013.01); *H01R 13/405* (2013.01); *H01R 13/502* (2013.01); *H01R 13/5202* (2013.01)
(58) Field of Classification Search
  CPC .............. H01R 13/405; H01R 13/502; H01R 13/5202; H01R 2201/26; H01R 31/06; F16H 61/688
  See application file for complete search history.

(56) References Cited

U.S. PATENT DOCUMENTS

| | | | |
|---|---|---|---|
| 8,057,248 | B1 | 11/2011 | Sherman |
| 8,162,673 | B2 * | 4/2012 | Chen ................... H05K 9/0064 439/862 |
| 8,672,228 | B1 * | 3/2014 | Saini ....................... G02B 6/36 439/39 |
| 8,753,139 | B2 | 6/2014 | Moosmann et al. |
| 10,886,687 | B2 * | 1/2021 | Ludwig ................. G01H 11/08 |
| 10,950,960 | B2 * | 3/2021 | Burns ...................... A61B 5/01 |
| 2002/0013079 | A1 | 1/2002 | Yoshimatsu et al. |
| 2003/0232529 | A1 * | 12/2003 | Peng ..................... H01R 12/82 439/142 |
| 2012/0118097 | A1 * | 5/2012 | Ilch ........................ B25J 9/0078 901/19 |
| 2012/0142210 | A1 * | 6/2012 | Di Stefano ............... H01R 4/48 439/700 |
| 2013/0045639 | A1 * | 2/2013 | Zhang .................... H01R 12/57 439/660 |
| 2015/0333442 | A1 * | 11/2015 | Naganuma ............. H01R 12/91 439/121 |
| 2016/0285183 | A1 * | 9/2016 | Chen .................. H01R 12/7076 |
| 2017/0187151 | A1 * | 6/2017 | Chu ........................ H01R 13/24 |
| 2019/0013267 | A1 * | 1/2019 | Franke ............. H01L 23/49811 |
| 2020/0161783 | A1 * | 5/2020 | He ...................... H01R 12/7076 |
| 2020/0243282 | A1 * | 7/2020 | Ritchie ............... B23K 37/0258 |
| 2021/0013659 | A1 * | 1/2021 | Moosmann .......... H01R 13/521 |
| 2021/0226381 | A1 * | 7/2021 | Borges ................... A61M 5/172 |
| 2021/0320447 | A1 * | 10/2021 | Reichert .............. H01R 12/714 |

FOREIGN PATENT DOCUMENTS

| | | |
|---|---|---|
| DE | 102010062946 A1 | 6/2012 |
| WO | WO 2012/079842 | 6/2012 |

OTHER PUBLICATIONS

German Search Report DE102018203970.4, dated Jan. 17, 2019. (12 pages).

* cited by examiner

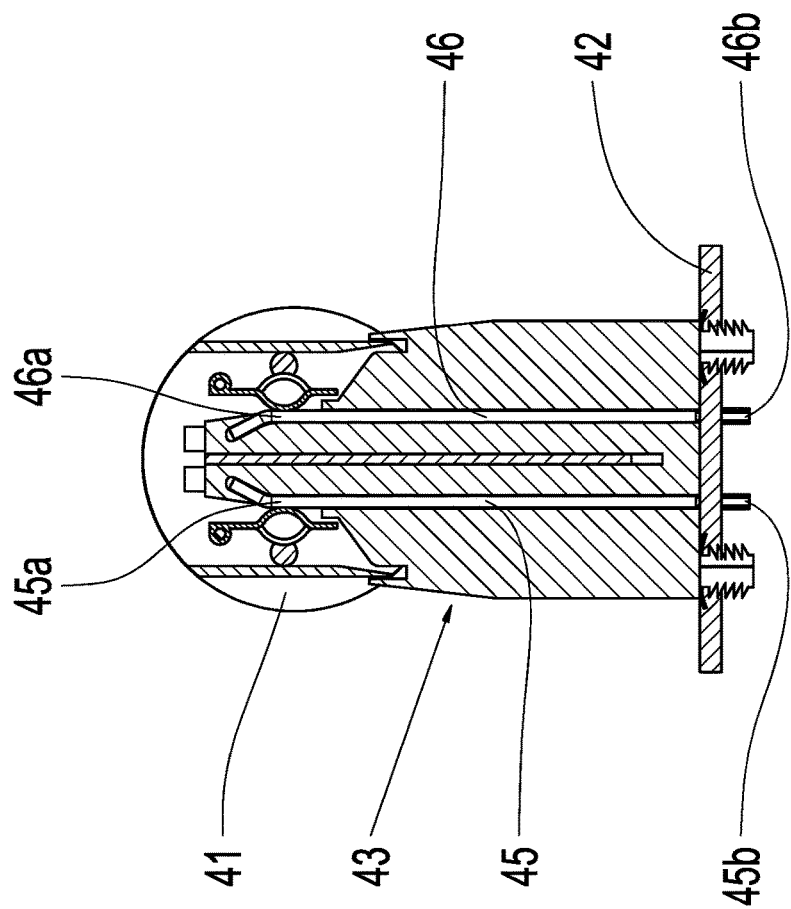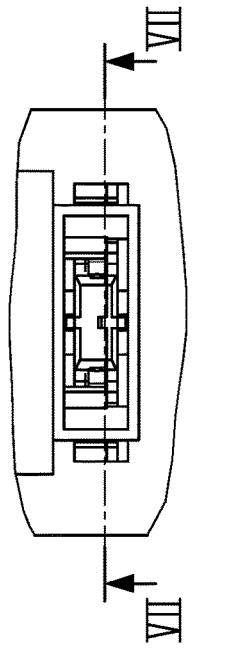

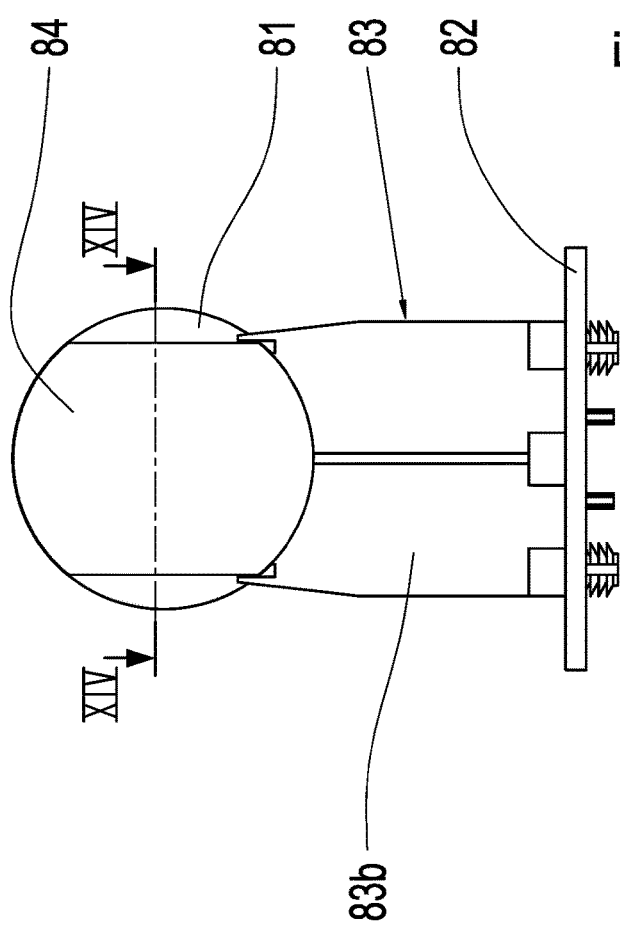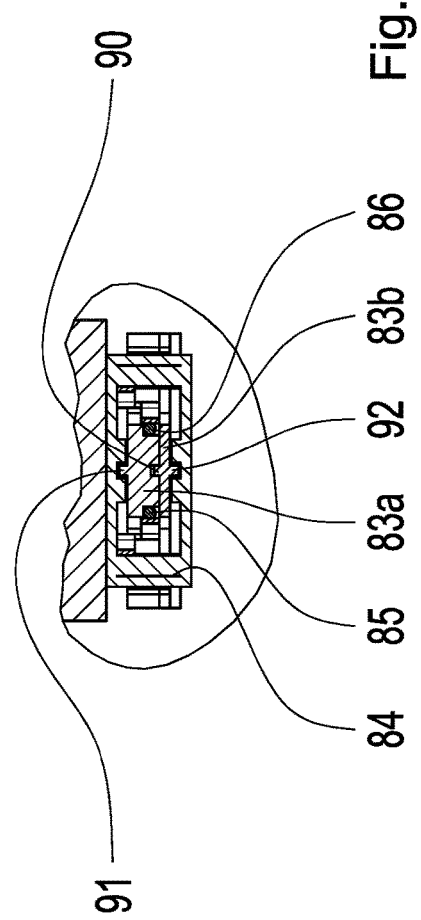
Fig. 13
Fig. 14

BRIDGE ELEMENT FOR ESTABLISHING AN ELECTRICAL CONNECTION, AND ARRANGEMENT

CROSS-REFERENCE TO RELATED APPLICATION

The present application is related and has right of priority to International Application No. PCT/EP2019/053774 filed on Feb. 15, 2019 and published as WO 2019/174854 and also to German Patent Application No. 10 2018 203 970.4 filed on Mar. 15, 2018, both of which are incorporated by reference in their entirety for all purposes.

FIELD OF THE INVENTION

The invention relates generally to a bridge element for establishing an electrical and mechanical connection between an actuator and an electronic circuit arrangement for a transmission control unit of a transmission. The invention also relates generally to an arrangement for the electrical and mechanical connection of an actuator to an electronic circuit arrangement, preferably a printed circuit board, for a transmission control unit of a transmission.

BACKGROUND

DE 10 2009 046 618 A1 of the applicant made known a device for the mechanical fixing and electrical contacting of actuating elements, which are also referred to as actuators. The actuators are designed as solenoid valves, in particular switching and/or pressure control valves, which are arranged in a hydraulic control unit. The electrical contacting of the actuators takes place with the aid of a connecting element, at which counter-contacts are provided for contacting the contacts to the actuators. A mechanical fixing of the actuators at the hydraulic control unit takes place simultaneously with the electrical contacting of the actuators.

DE 103 37 197 A1 made known an arrangement for the electrical contacting of a solenoid valve, which includes contact elements arranged in a contact housing and which are contacted to a printed circuit board arranged on a carrier element. The printed circuit board includes counter-contact elements, which, together with the contact elements of the solenoid valve, form pressure contacts. Groove-shaped recesses are provided in the support, into which the face ends of the valve housing engage, whereby a labyrinth sealing is formed, which is to prevent the penetration of dirt particles, in particular metal chips, into the contact housing.

SUMMARY OF THE INVENTION

Example aspects of the invention establish an electrical connection between actuators, such as, in particular, a hydraulic control unit, on the one hand, and an electronic circuit arrangement, on the other hand, for an (electronic) transmission control unit.

According to a first example aspect of the invention, the proposed bridge element is provided for establishing the electrical connection. The bridge element includes first electrical contacts for contacting the actuator and second electrical contacts for contacting the electronic circuit arrangement for a transmission control unit of a transmission. The first and the second electrical contacts, which are arranged, in particular, at opposite ends of the bridge element, are electrically conductively connected to each other by electrical conductors. Simultaneously, a first mechanical connection to the actuator is established with the aid of the bridge element. The bridge element can therefore be simultaneously electrically and mechanically connected to the actuator with the aid of a plug-in process. The second electrical contacts are designed, in particular, in such a way that the bridge element is usable as a double plug. The term "bridge element", which is also referred to as a connecting element, then contains the function of a double plug.

The term "actuator" is understood to mean actuating elements, such as, in particular, solenoid valves, in particular switching valves or pressure control valves. The actuator can be part of a hydraulic control unit of the transmission, which is also referred to as a hydraulic transmission control unit. The actuator can be mechanically fixed in a manner other than with the aid of the bridge element. The actuator can therefore be mechanically fixed, for example, at the hydraulic control unit.

The first and second contacts of the bridge element are preferably utilized for the complete electrical contacting of the actuator, i.e., further electrical contactings are not provided. After the electrical connection to the electronic circuit arrangement has been established with the aid of the bridge element, the actuator is therefore electrically ready for use.

Such an (electronic) transmission control unit of a transmission is utilized, in particular, for actuating elements of the transmission with the aid of actuators, such as, in particular, for actuating transmission shift elements. The transmission control unit is utilized, in particular, for effecting gear shifts within the transmission, such as, in particular, for effecting the engagement and/or disengagement process of certain gears of the transmission. Alternatively or additionally, the transmission control unit can be utilized for engaging or disengaging or for controlling certain mechanical inputs or outputs of the transmission. The electronic circuit arrangement can include an electronic transmission control unit. This transmission control unit can be designed as one or multiple microcontroller(s) on the electronic circuit arrangement.

The bridge element includes, in particular, a housing (bridge element housing), which at least partially accommodates and, as a result, mechanically fixes the electrical conductors. The electrical conductors can protrude from the housing at least in the area of the first and second electrical contacts. Preferably, the housing forms the first mechanical connecting elements. With the aid of the first mechanical connecting elements, the bridge element is mechanically fixable at the actuator.

According to one preferred example embodiment, the bridge element includes second mechanical connecting elements for a connection between the bridge element and the electronic circuit arrangement in the area of the second electrical contacts. Therefore, the bridge element is usable as a double plug. Preferably, the housing also forms the second mechanical connecting elements. With the aid of the second mechanical connecting elements, the bridge element is mechanically fixable at the electronic circuit arrangement.

According to one further preferred example embodiment, the first electrical contacts, which are in contact with the actuator, are designed as spring pressure contacts, i.e., the electrical contact is established by the pressure of a spring element.

According to one further preferred example embodiment, the first electrical contacts are designed as knife/fork contacts, which form an alternative to the aforementioned spring pressure contacts. In the case of the knife/fork contact, a closed power path results, since the contact pressure generated via the spring-loaded legs of the fork is absorbed by the fork itself.

According to one further preferred example embodiment, the second electrical contacts, which are in contact with the electronic circuit arrangement, are designed as spring pressure contacts, whose pressure direction corresponds to the plug-in direction.

According to one preferred alternative example embodiment, the second electrical contacts are designed as pin/hole plug contacts. The second electrical contact at the bridge element can be designed as a pin, which is insertable into a corresponding hole or a sleeve in the electronic circuit arrangement, in order to establish the electrical contacting in this way. The pin/hole plug contact can be designed for establishing a press-fit connection. In this case, the pin is designed for being pressed into the hole or into the sleeve. Alternatively or additionally, the pin/hole plug contact can be designed for establishing a soldered connection. In this case, the pin is designed for being soldered to the hole or to the sleeve. When the sleeve is used, such a pin/hole plug contact can also be referred to as a pin/sleeve plug contact.

The bridge element can therefore be equipped and utilized with spring pressure contacts and/or with knife/fork contacts and/or with pin/hole plug contacts, i.e., with different types of contacts.

According to one further preferred example embodiment, the first mechanical connecting elements are designed as detent or snap-in elements, i.e., the bridge element can be mechanically connected to the actuator with the aid of one simple plug-in movement, without further aids. The electrical contact is established via spring pressure, in particular, simultaneously with the mechanical connection.

The first mechanical connecting elements can be arranged on an inner side of the bridge element. The first mechanical connecting elements are then arranged between two of the first electrical contacts, in particular in the center of the bridge element. Alternatively, the first mechanical connecting elements can be arranged on outer sides of the bridge element. The first mechanical connecting elements are therefore arranged on both sides of the first electrical contacts.

According to one further preferred example embodiment, the second mechanical connecting elements are designed as detent or snap-in elements. The bridge element can therefore be mechanically connected to the electronic circuit arrangement, in particular a printed circuit board, with the aid of a plug-in movement. Preferably, the second connecting elements are designed as tree-like pins (tree profile) or mushroom-shaped pins (mushroom profile), which bring about a force-locking and/or form-locking connection to the electronic circuit arrangement.

According to one further preferred example embodiment, the electronic circuit arrangement is designed as a printed circuit board. Such a printed circuit board is designed, in particular, as a solid support for electronic components and strip conductors, for example, as a glass fiber-reinforced resin board.

According to one further preferred example embodiment, the electronic circuit arrangement is designed as a coated stamped grid, which forms an alternative to the printed circuit board. Stamped grids are circuit boards, which can be separated out of a material strip with the aid of a blanking tool and equipped with electronic components and also with the bridge element according to example aspects of the invention. For the purpose of electrical insulation and, if necessary, mechanical stabilization, such a stamped grid is coated with plastic, such as a thermo-plastic or a thermo-setting plastic, in order to form the coated stamped grid.

According to one further preferred example embodiment, the first and second electrical contacts as well as the electrical conductors connecting these two contacts are designed as contact spring wires. A contact spring wire therefore includes a first electrical contact for contacting the actuator and a second electrical contact for contacting the printed circuit board, wherein both contacts are electrically conductively and mechanically connected to one another via the contact spring wire. In addition, the contact spring wire can form spring elements at the contact point(s), which generate the contact pressure necessary there.

According to one further preferred example embodiment, the electrical conductors between the first and second contacts are designed as sheet metal strips, with the aid of which spring pressure contacts or knife-like contact blades can also be implemented.

According to one further preferred example embodiment, the bridge element has a longitudinal or plug-in axis, wherein the plug-in axis corresponds to the plug-in direction during the establishment of the mechanical connections. The pressure direction of the first electrical spring pressure contact extends essentially perpendicularly to the longitudinal or plug-in axis of the bridge element.

According to one further preferred example embodiment, the pressure direction of the second electrical spring pressure contacts extends in parallel to the longitudinal or plug-in axis of the bridge element. It is therefore ensured that a contact pressure is exerted perpendicularly onto the electronic circuit arrangement. This contact pressure is absorbed by the second mechanical connecting elements, preferably a detent or snap-in connection, between the bridge element and the electronic circuit arrangement. Therefore, the power flow between the bridge element and the electronic circuit arrangement is closed.

According to one further preferred example embodiment, the electronic circuit arrangement includes the particular corresponding receiving openings for the second mechanical connecting elements. Therefore, the electronic circuit arrangement can be equipped with the bridge element with the aid of one simple plug-in movement, wherein an electrical contacting and a mechanical contacting take place simultaneously.

The electronic circuit arrangement, which is also referred to as a module, can be equipped with multiple bridge elements. Therefore, the electronic circuit arrangement can be delivered as a preassembled component including the multiple bridge elements. Thereafter, the equipped electronic circuit arrangement can be simultaneously electrically and mechanically connected to multiple actuators arranged next to one another or in a row.

According to one further preferred example embodiment, a labyrinth sealing is arranged between the first and second contacts and the associated electrical conductors, which are arranged on one side of the bridge element, and the first and second contacts and the associated electrical conductors, which are arranged (if necessary, mirror symmetrically) on the other side of the bridge element. The labyrinth sealing extends, in particular, in the longitudinal or plug-in direction of the bridge element. The labyrinth sealing prevents electrically conductive particles, such as metal chips floating in the transmission oil, from traveling from one contact side to the other contact side and, therefore, establishing an electrically conductive bridge, which could result in a short circuit. Such a labyrinth sealing can be arranged on an outer side of the bridge element, such as, in particular, on an outer side of the housing of the bridge element. Alternatively or additionally, such a labyrinth sealing can be arranged within the bridge element, such as, in particular, within the parting plane of two mutually joinable housing halves of the housing of the bridge element.

According to one further preferred example embodiment, the labyrinth sealing is designed, on the one hand, as a groove-shaped recess and, on the other hand, as a ridge engaging into the recess. Therefore, an effective seal results, which is integrated into the bridge element and gets by without additional sealing elements. Preferably, the (preferably continuous) labyrinth sealing is arranged (in particular centrally) between the electrical conductors of the bridge element, which are therefore electrically insulated with respect to each other.

According to one further preferred example embodiment, grooves and/or ridges can also be arranged on the outer side of the bridge element in order to form a labyrinth sealing with an actuator-side contact housing. The labyrinth sealing is also preferably located between the electrical conductors of the bridge element.

According to one further preferred example embodiment, the bridge element includes two mutually joinable housing halves, in or between which the electrical conductors of the bridge element are accommodated and fixed in a form-locking manner. Preferably, the two housing halves are designed as plastic injection-molded parts including preformed recesses or indentations for the contact spring wires.

Alternatively or additionally, the electrical conductors can be molded into the housing or into a housing part of the bridge element (for example, into one of the housing halves) and, therefore, fixed. The housing can then be designed as a plastic injection-molded part, wherein the electrical conductors are injected therein. The housing can therefore also be designed as one piece.

Preferably, the housing also forms the first and/or the second mechanical connecting elements. Therefore, the bridge element can be easily manufactured.

According to one further example aspect of the invention, in the case of the provided arrangement for the electrical connection of an actuator to an electronic circuit arrangement for a transmission control unit of a transmission, the proposed bridge element is provided for establishing this connection.

The bridge element, which functions as a double plug and can also be referred to as a double plug, bridges the spatial distance, which exists due to the installation situation between the actuator and the electronic circuit arrangement.

Multiple actuators, which are preferably fixed at a common hydraulic control unit, can be arranged in a row. As mentioned above, the common electronic circuit arrangement can be equipped, in advance, with an appropriate number of bridge elements, whereby an electrical and mechanical connection is established between each bridge element and the circuit arrangement. The equipped common electronic circuit arrangement, which can be designed as a module of an electronic transmission control unit, can then be simultaneously connected to the multiple actuators by plugging. In the case of different distances between the individual actuators and the circuit arrangement, the utilized bridge elements can differ in terms of their lengths, in order to compensate for the different distances.

In other words, the arrangement can therefore provide multiple actuators and a common electronic circuit arrangement for these actuators. Precisely one of the proposed bridge elements is provided for each actuator in order to establish the individual connections between the actuators and the common circuit arrangement. These bridge elements can be arranged, for example, in a row on the common circuit arrangement.

Several of the provided bridge elements can be mechanically coupled to one another, in particular via their housing. Therefore, a common assembly on a common electronic circuit arrangement can be simplified.

According to one preferred example embodiment, the actuator includes, on an face end of the actuator, connection contacts designed as contact pins, which are in contact with the first spring pressure contacts of the bridge element. The bridge element is therefore easily inserted between the contact pins, whereby the electrical contact is established.

According to one further preferred example embodiment, the circuit arrangement includes second electrical connection contacts, for example, so-called contact pads, i.e., contact surfaces arranged on the surface, or via holes (hole contacts), which, together with the second electrical contacts of the bridge element, form second contactings.

According to one further preferred example embodiment, the electronic circuit arrangement can be equipped by being plugged to the bridge element, wherein the electrical connection and the mechanical connection between the actuator and the electronic circuit arrangement can be simultaneously established.

According to one further preferred example embodiment, the actuator includes a contact housing. With the aid of the contact housing and the bridge element, one or multiple labyrinth sealing(s) can then be formed in the area of the contact housing.

According to one further preferred example embodiment, the bridge element and/or the arrangement are/is utilized for establishing the electrical connection for a transmission control unit of a vehicle transmission. The aforementioned transmission is therefore, in particular, a vehicle transmission. The transmission can therefore be any type of vehicle transmission that comprises the actuator(s) and the transmission control unit. Such a vehicle transmission can be an automatic transmission or an automated transmission. This also includes a dual clutch transmission or a transmission comprising a hydrodynamic torque converter or a mixed form thereof, or a hydrostatic transmission. The vehicle transmission can also be a transfer gearbox, for example, of an all-wheel drive train, or the vehicle transmission can also be a reversing gearbox for a rail vehicle. In principle, the invention is not limited to the explicitly mentioned transmission types, however.

BRIEF DESCRIPTION OF THE DRAWINGS

Exemplary embodiments of the invention are represented in the drawing and are described in greater detail in the following, wherein further features and/or advantages can result from the description and/or the drawing. Wherein

FIG. 7 shows one further exemplary embodiment including modified second electrical contacts between the bridge element and the printed circuit board;

FIG. 8 shows a view from above onto the contact housing of the actuator according to FIG. 7;

FIG. 13 shows a view of an actuator including contact housing, a bridge element, and an electronic circuit arrangement;

FIG. 14 shows a section in the plane XIV-XIV in FIG. 13;

DETAILED DESCRIPTION

Figure 2:
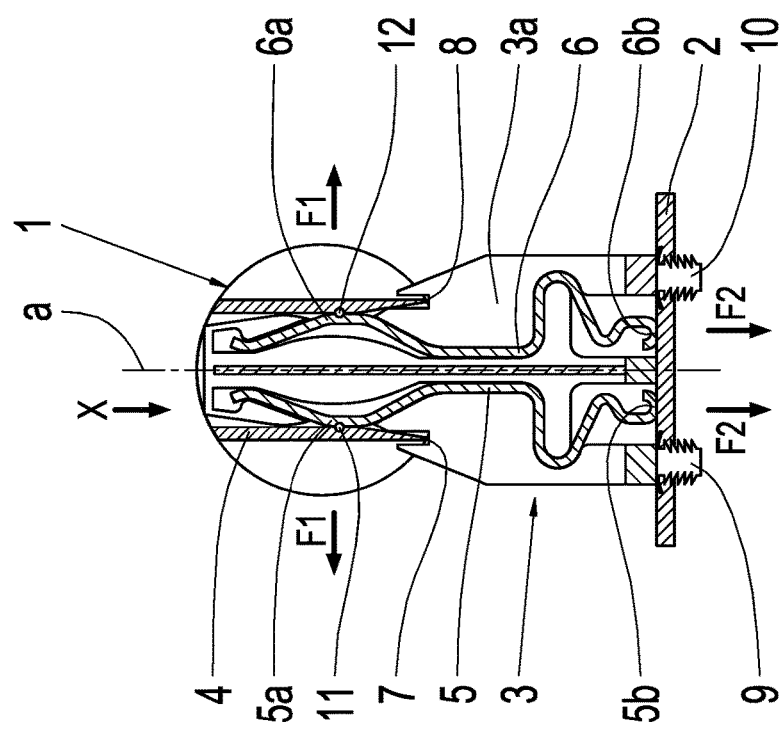
FIG. 2 shows a longitudinal section through the bridge element according to FIG. 1 including an electrical contacting of the actuator and the electronic circuit arrangement.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
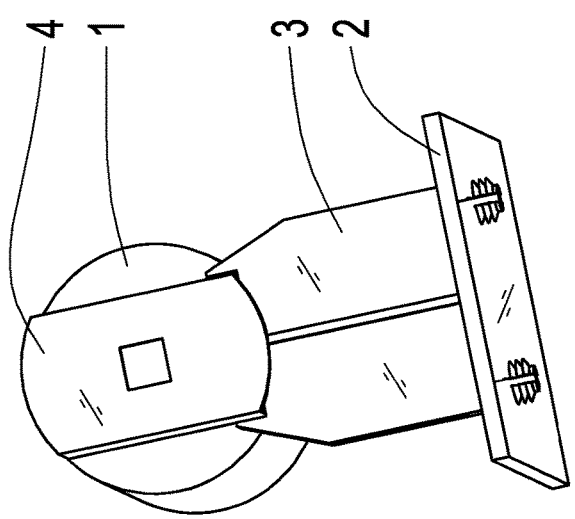
FIG. 1 shows an arrangement of an actuator and an electronic circuit arrangement, connected by a bridge element.

FIG. 1 shows an arrangement of an actuator 1 and a diagrammatically represented detail of an electronic circuit arrangement 2 and a bridge element 3, which electrically connects the actuator 1 to the circuit arrangement 2. The electronic circuit arrangement 2 is designed as a printed circuit board 2 in this case. It can also be designed, for example, as a coated stamped grid.

The actuator 1 includes a contact housing 4 on the end face and is preferably designed as a solenoid valve, in particular as a switching or pressure control valve for a hydraulic control unit (not represented) of a transmission control unit of a transmission for motor vehicles. The circuit arrangement 2 is, in particular, an essential integral part of an electronic transmission control unit (TCU) of the transmission. The actuator 1 is electrically actuated by the circuit arrangement 2, for example, in order to initiate a shift of a gear of the transmission.

Figure 3:
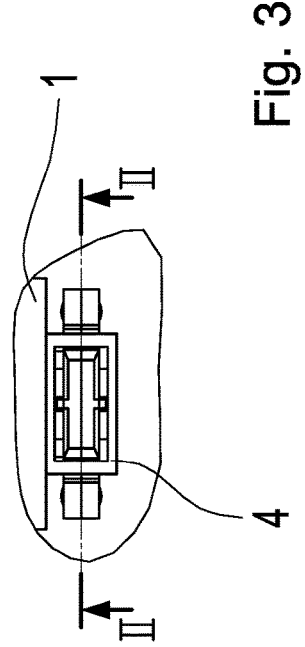
FIG. 3 shows a view in the direction X (from above) onto the actuator according to FIG. 1 including contact housing and bridge element.

FIG. 2 shows a section through the bridge element 3, and FIG. 3 shows a view in the direction X onto the actuator 1. The cutting plane for FIG. 2 is labeled by II-II in FIG. 3. The bridge element 3 preferably includes two housing halves, of which the lower housing half 3a is represented in FIG. 2 with a view of an inner side of the lower housing half 3a. Two contact spring wires 5, 6, which are designed to be partially spring-loaded, as electrical conductors, are arranged and fixed in indentations (without a reference number in this case) within the housing half 3a.

The bridge element 3, in particular the housing half 3a, includes first mechanical connecting elements 7, 8, preferably designed as detent or snap-in elements 7, 8, for the mechanical connection to the actuator 1 or to contact housing 4, and second mechanical connecting elements 9, 10, preferably designed as detent or snap-in elements 9, 10, for the fixing at the circuit arrangement 2. The bridge element 3 is mechanically connected to the actuator 1 as well as to the printed circuit board 2 with the aid of the first and second mechanical connecting elements 7, 8, 9, 10.

The connecting elements 7, 8 between the bridge element 3 and the actuator 1 are preferably designed to be releasable, in order, for example, to be able to carry out a replacement of the actuator 1. By comparison, the connecting elements 9, 10 of the bridge element 3 for the printed circuit board 2 can be designed to be non-releasable, since they are provided for a permanent equipping of the circuit arrangement 2 with the bridge element 3.

The contact spring wires 5, 6 form, in the area of the contact housing 4, first electrical, elastically designed pressure contacts 5a, 6a and, in the area of the circuit arrangement 2, second electrical, elastically designed pressure contacts 5b, 6b. The actuator 1 includes first connection contacts 11, 12, which are arranged on the end face and are designed as contact pins 11, 12. The contact pins 11, 12 are contacted by the first electrical pressure contacts 5, 6 of the two contact spring wires 5, 6. The pressure direction of the first electrical pressure contacts 5a, 6a is indicated by arrows F1 and extends perpendicularly to the longitudinal axis a of the bridge element 3. The longitudinal axis a simultaneously forms a plug-in axis, along which the bridge element 3, on the one hand, can be plugged into the contact housing 4 and, on the other hand, can also be mounted onto the circuit arrangement 2. The contact spring wires 5, 6 are supported elastically toward the outside against the contact pins 11, 12.

As is apparent from FIG. 2, the second electrical contacts 5b, 6b are designed to be spring-loaded, wherein the pressure direction of the pressure contacts 5b, 6b is indicated by arrows F2 and extends in parallel to the longitudinal axis a of the bridge element 3. Contact pads (not represented) are arranged on the circuit arrangement 2 in the area of the pressure contacts 5b, 6b. That is, thickenings of material are arranged on the surface of the circuit arrangement 2 for the electrical contacting of the pressure contacts 5b, 6b. The contact pressures F2 are absorbed by the second mechanical connecting elements 9, 10 operating as tie-rods. As a result of the pressure directions F1, F2 arranged perpendicularly to one another, an addition of tolerances is avoided for the first and second electrical contacts 5a, 6a, 5b, 6b.

The contact housing 4 is apparent in FIG. 3, which has a closed, rectangular cross-section and, as is apparent from FIG. 2, is open on the end face, so that the bridge element 3 can be pushed in the direction of the plug-in axis a into the contact housing 4.

Figure 4:
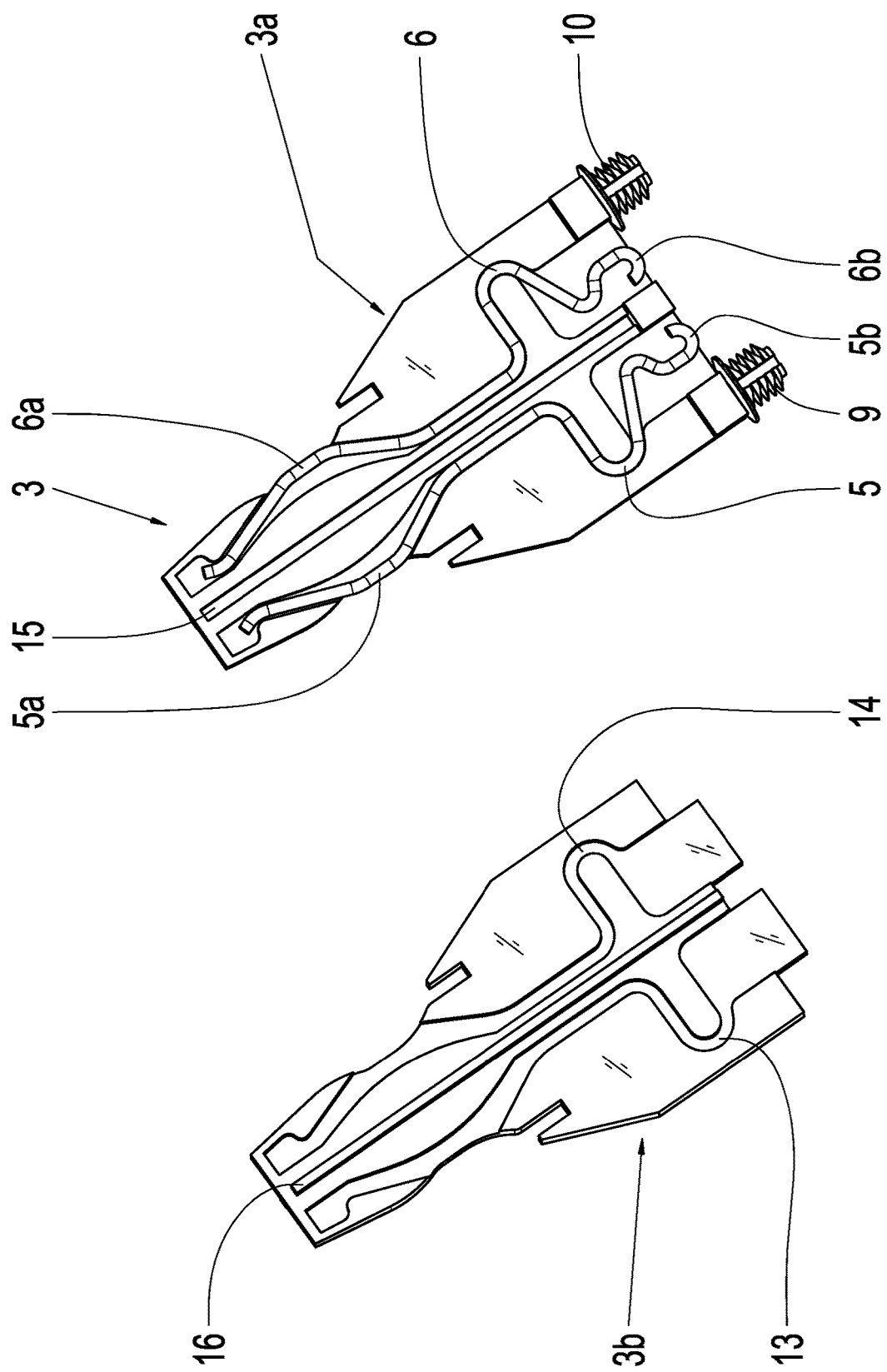
FIG. 4 shows a first and a second housing half of the bridge element including inserted contact spring wires.

FIG. 4 shows the bridge element 3, which includes a first housing half 3a with inserted contact spring wires 5, 6, and a second housing half 3b, which is joined together with the first housing half 3a to form the bridge element 3. The first housing half 3a includes the second connecting elements 9, 10, which form a tree profile, with the aid of which a force-locking and/or form-locking fit in the electronic circuit arrangement 2 (see FIG. 2) is achieved. Other embodiments, for example, slotted and spreadable pins having a mushroom profile (see, for example, FIG. 9 and FIG. 10) are also possible for the second connecting elements 9, 10. Recesses or indentations 13, 14 are formed into the second housing half 3b, which correspond to the shape of the contact spring wires 5, 6 and, therefore, bring about a fixation of the contact spring wires 5, 6 within the bridge element 3. In the area of the first electrical contacts 5a, 6a and the second electrical contacts 5b, 6b, the contact spring wires 5, 6 protrude outward from the bridge element 3, in order to establish a spring-loaded pressure contacting with the particular counter-contacts of the actuator 1 and the circuit arrangement 2. Together, the two housing halves 3a, 3b result in the housing of the bridge element 3. In addition to the housing halves 3a, 3b, the housing can include additional housing parts, provided this is advantageous. The housing can also be designed as one piece.

A groove 15 (extending in a straight line) is centrally arranged between the two contact spring wires 5, 6, while the second housing half 3b includes a ridge 16 centrally arranged between the recesses 13, 14. The groove 15 and the ridge 16 correspond to each other. When the two housing halves 3a, 3b are joined, the ridge 16 therefore engages into the groove 15 and, in this way, forms a labyrinth sealing, which prevents a contact bridge between the contact spring wires 5, 6.

Figure 5:
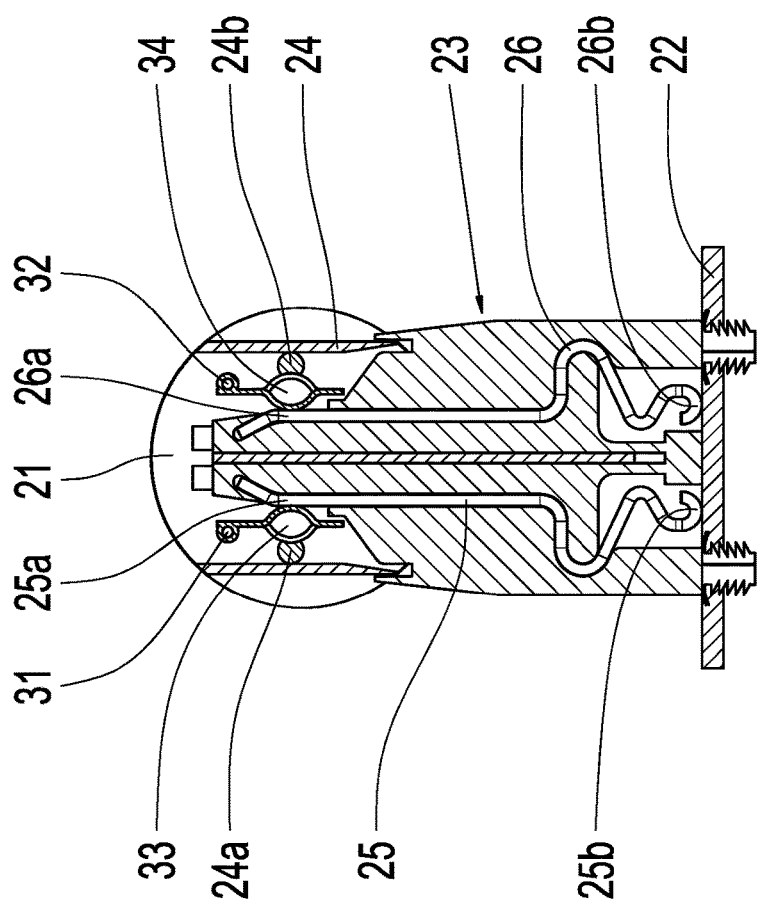
FIG. 5 shows one further exemplary embodiment including modified electrical contacts between bridge element and actuator.
Figure 6:
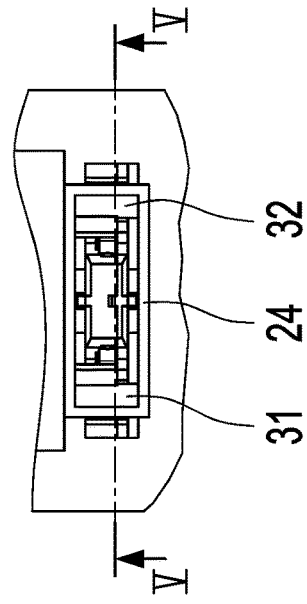
FIG. 6 shows a view from above onto the actuator according to FIG. 5 including contact housing.

FIG. 5 and FIG. 6 show one further exemplary embodiment for a bridge element 23, which, as compared to FIGS. 2 through 4, includes modified contact spring wires 25, 26 as electrical conductors and modified first electrical pressure contacts 25a, 26a. The connection contacts of the actuator 21, which are designed as contact pins 31, 32, are arranged within the contact housing 24. The connection contacts are connected to electrically conductive spring elements 33, 34 of the actuator 21 in a form-locking and electrically conductive manner. The contact pins 31, 32 and the spring elements 33, 34 are therefore connected to each other in a pivoting or hinge-like manner. The spring elements 33, 34 are supported between the contacts 25a, 26a of the bridge element 23, which are designed not to be spring-loaded here, and, in this way, generate the necessary contact pressure. The second electrical contacts 25b, 26b are designed similarly to the second electrical contacts 5b, 6b from FIG. 1 through FIG. 4, as are the second mechanical connecting elements (without reference numbers in this case). Otherwise, the previous comments also apply for this exemplary embodiment.

FIG. 7 and FIG. 8 show one further exemplary embodiment for a bridge element 43 including contact wires 45, 46 as electrical conductors. The second electrical contacts 45b, 46b of the bridge element 43 are designed as pin/hole contacts or pin/sleeve contacts. In the electronic circuit arrangement 42 (for example, a printed circuit board), openings (not represented) or holes or sleeves are arranged, into or through which the pin-shaped ends of the contact wires 45, 46 (pin/hole contacts, pin/sleeve contacts) are inserted, so that an electrical contacting to the printed circuit board 42 is established. This plug connection is therefore not a spring pressure contacting, as described above with reference to FIGS. 5 and 6, but rather an alternative thereto. The first electrical contacts 45a, 46a are also designed as spring pressure contacts, similarly to the first electrical contacts 25a, 26a according to FIG. 5. This also applies for the second mechanical connecting elements (without reference numbers in this case). Otherwise, the previous comments also apply for this exemplary embodiment.

Figure 10:
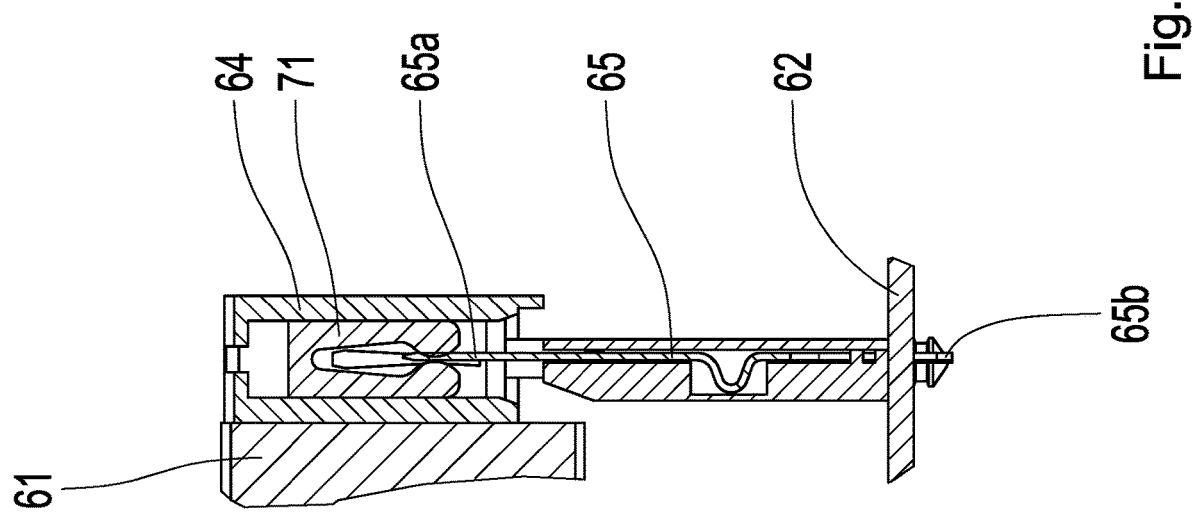
FIG. 10 shows a section in the plane X-X in FIG. 9.
Figure 9:
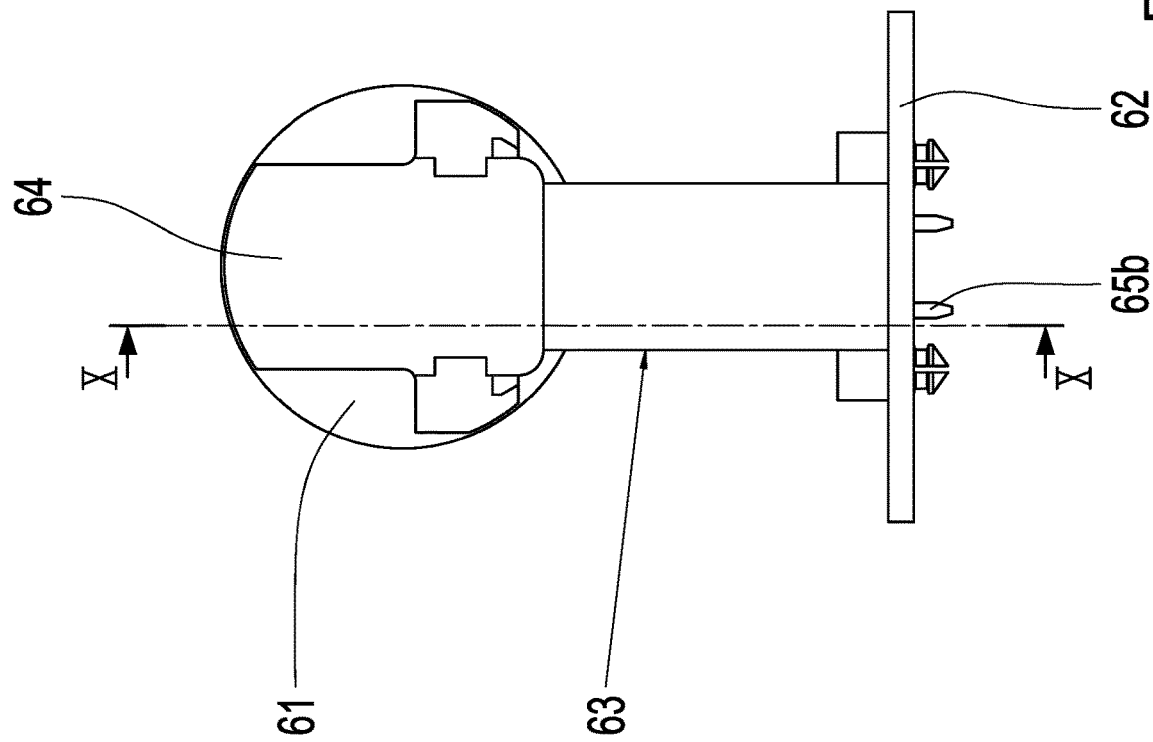
FIG. 9 shows one further exemplary embodiment for an arrangement of an actuator, a bridge element, and an electronic circuit arrangement including modified electrical contacts.

FIG. 9 and FIG. 10 show one further exemplary embodiment for a bridge element 63, which is arranged between the actuator 61 and the electronic circuit arrangement 62 (for example, a printed circuit board). FIG. 10 shows a section in the plane X-X in FIG. 9. The differences in this case as compared to the preceding exemplary embodiments are the contact interfaces between the actuator 61 and the bridge element 63. The contact interface according to FIG. 10 is designed as a knife/fork contact. The connection contact 71, which is designed in a U-shape as a fork and includes a contact slot, is arranged in the contact housing 64 of the actuator 61. A contact blade 65a, which is referred to as a "knife", as the first electrical contact, is inserted into this fork. The contact pressure is generated by the spring-loaded legs of the fork 71. The first electrical contact 65a is electrically conductively connected—through the bridge element 63—to the second electrical contact 65b with the aid of an electrical conductor designed as a sheet metal strip 65. This is designed as a contact pin 65b and is inserted, in particular pressed, into a contact opening of the printed circuit board 62. It therefore forms a pin/hole contact (pin/sleeve contact) similarly to FIG. 7 and FIG. 8. The second connecting elements (without reference numbers in this case) are designed, by way of example, as a mushroom profile. They can also be designed differently, however, for example, as a tree profile (see, for example, FIG. 4). The same mushroom profile can also be provided instead of the tree profile in the other exemplary embodiments shown. Otherwise, the previous comments also apply for this exemplary embodiment.

The advantage of the "knife/fork contact", on the one hand, is that no narrow tolerances must be observed in the plug-in direction and, on the other hand, that the contact pressure does not need to be supported toward the outside, for example, onto the contact housing 64, since the arrangement of "knife" and "fork" form a closed power flow.

Figure 11:
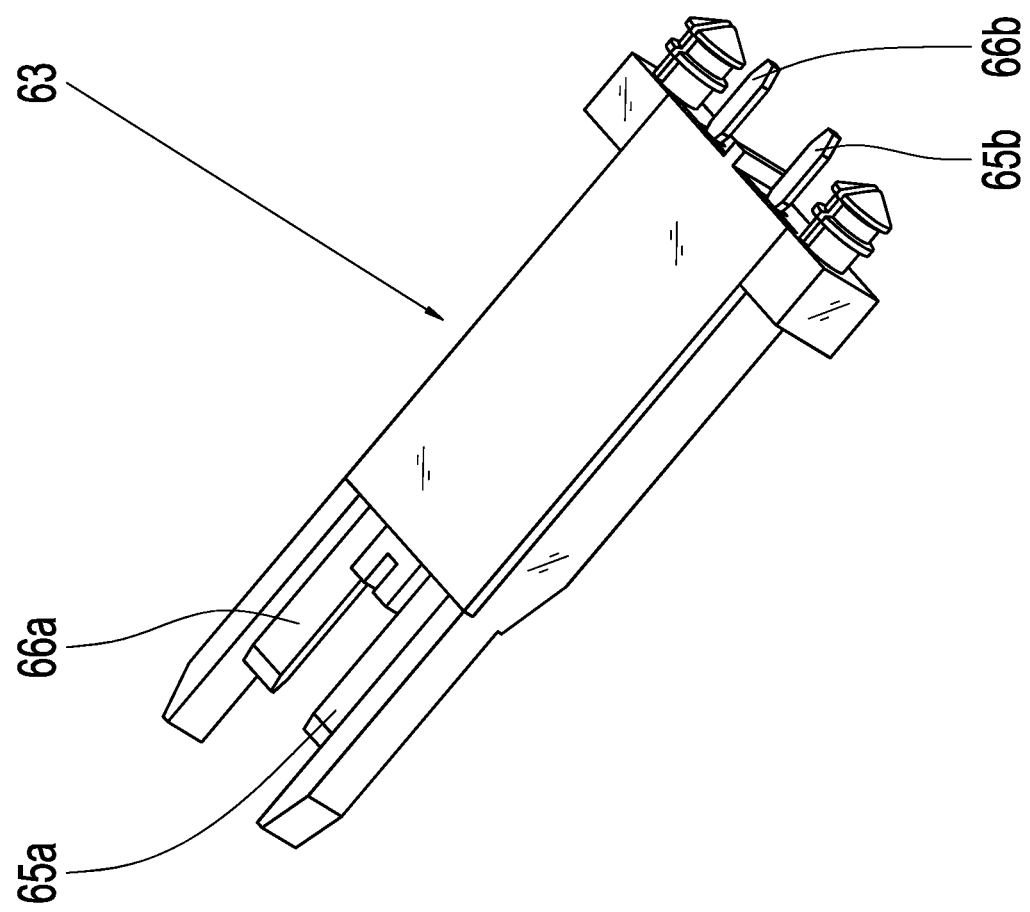
FIG. 11 shows an isometric view of the bridge element according to FIG. 9.

FIG. 11 shows the bridge element 63 in an isometric representation as a single part, wherein the two first electrical contacts 65a, 66a, designed as contact blades, and the two second electrical contacts 65b, 66b, designed as contact pins, are clearly apparent. As FIG. 11 shows in a good manner, the first mechanical connecting elements for mechanically connecting the actuator 61 to the bridge element 63 are arranged on outer sides of the bridge element 63. The first mechanical connecting elements (without reference numbers in this case) are therefore arranged on both sides (outer sides) of the two electrical contacts 65a, 66a.

Figure 12:
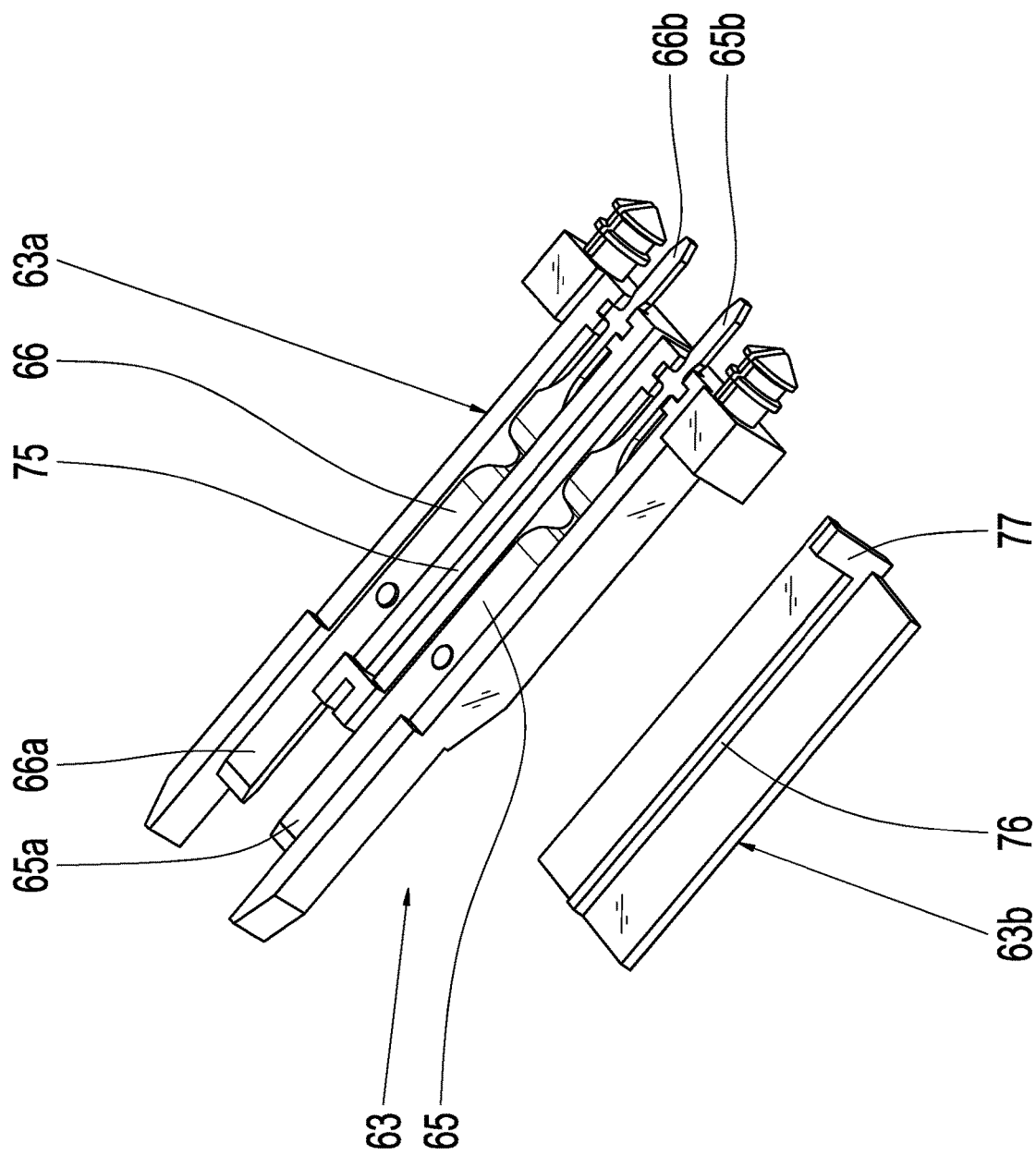
FIG. 12 shows an exploded view of the bridge element according to FIG. 9.

FIG. 12 shows the bridge element 63 in an exploded representation, separated into a first housing half 63a and a second housing half 63b. The two electrical conductors 65, 66, designed as sheet metal strips, are inserted into the first housing half 63a, and fixed. In order to produce a labyrinth sealing, the first housing half 63a includes a groove 75 and the second housing half 63b includes a longitudinal ridge 76 as well as a transverse ridge 77. The groove 75 and the ridges 76, 77 correspond to each other. During the joining of the two housing halves 63a, 63b, the longitudinal ridge 76 engages into the groove 75 and, therefore, forms a debris guard between the electrical conductors 65, 66. Similarly, the outwardly protruding transverse ridge 77 forms a debris guard between the two contact pins 65b, 66b. The outwardly protruding portion of the transverse ridge 77 can engage, for example, into a corresponding groove of the electronic circuit arrangement 62, in order to form a further improved debris guard. A corresponding transverse ridge can also be provided in the other exemplary embodiments of the bridge elements 3, 23, 43, 63, 83, 103 shown.

FIG. 13 and FIG. 14 show one further exemplary embodiment for a bridge element 83, which is arranged between the actuator 81 and the electronic circuit arrangement 82 (for example, a printed circuit board). FIG. 14 shows a section in the plane XIV-XIV in FIG. 13 including the contact housing 84. The bridge element 83 (FIG. 13) includes—as is apparent from FIG. 14—two housing parts lying one on top of the other, namely a first housing half 83a, in which the two electrical conductors, designed as contact wires 85, 86, are retained in appropriate recesses, and a second housing half 83b, which rests in a flat manner on the first housing half 83a. In the area of the parting plane between the first housing half 83a and the second housing half 83b, an inner labyrinth sealing 90 having the ridge and groove is centrally arranged between the two contact wires 85, 86 and forms a debris guard, i.e., prevents a contact bridge between the two contact wires 85, 86 due to metal chips. Similarly, an outer labyrinth sealing 91 is arranged between the outer side of the first housing half 83a and an inner wall of the contact housing 84, and a further outer labyrinth sealing 92 is arranged between the outer side of the second housing half 83b and an inner side of the contact housing 84. The two outer labyrinth sealings 91, 92 also have a groove and a ridge engaging into the groove and form a debris guard on the outer side of the bridge element 83. The same debris guard can be optionally provided in the other exemplary embodiments shown. Otherwise, the previous comments also apply for this exemplary embodiment.

Figure 16:
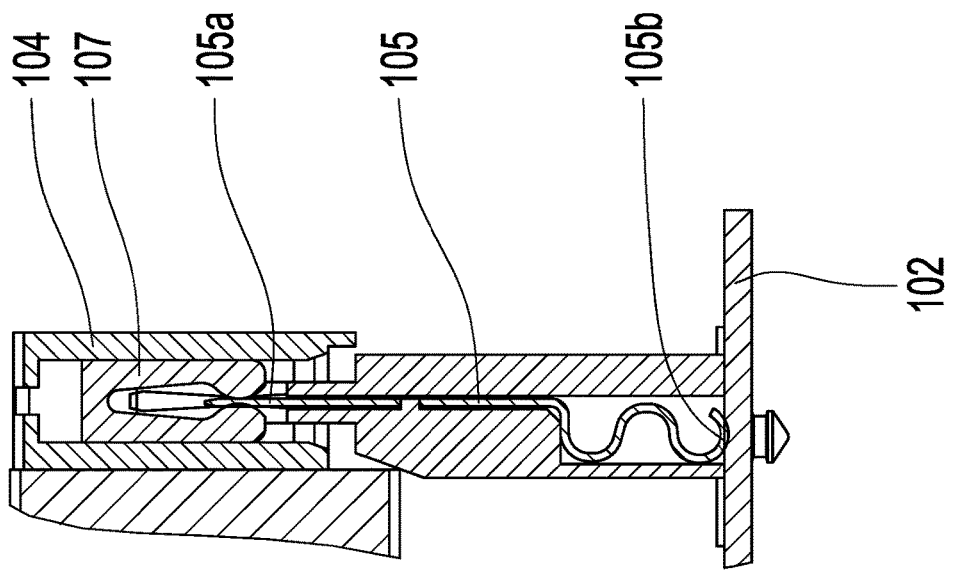
FIG. 16 shows a section in the plane XVI-XVI in FIG. 15.
Figure 15:
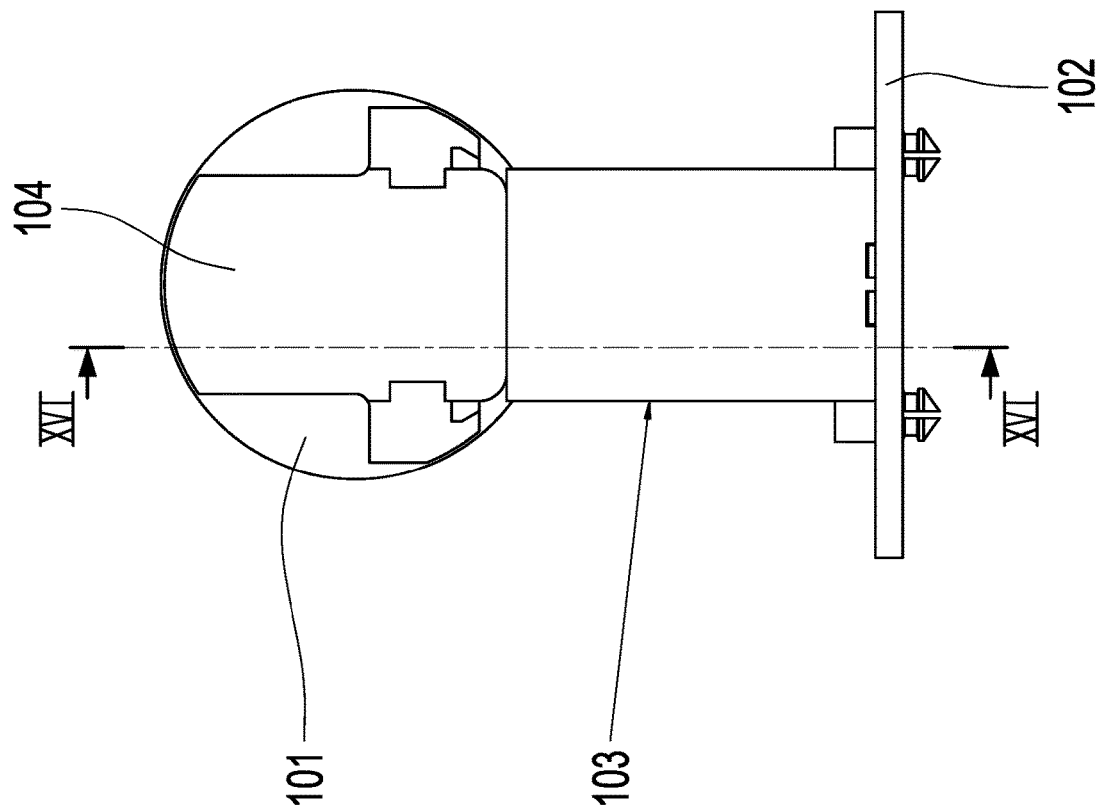
FIG. 15 shows one further exemplary embodiment for a bridge element including modified contacts.

FIG. 15 and FIG. 16 show one further exemplary embodiment for a bridge element 103, which is arranged between the actuator 101 and the electronic circuit arrangement 102 (for example, a printed circuit board). FIG. 16 shows a section in the plane XVI-XVI in FIG. 15. The difference in this case as compared to the preceding exemplary embodiments is the combination of the contact interfaces between the actuator 101 and the bridge element 103, on the one hand, and between the printed circuit board 102 and the bridge element 103, on the other hand. The contact interface with the actuator 101 according to FIG. 16 is designed as a knife/fork contact (see also FIG. 10 and FIG. 11). The connection contact 107 is arranged in the contact housing 104 of the actuator 101, which is designed in a U-shape as a fork and includes a contact slot, into which a contact blade 105, referred to as a "knife", is inserted. The contact blade 105a is also referred to as a first electrical contact 105a. The contact pressure is generated by the spring-loaded legs of the fork 107. The first electrical contact 105a is electrically conductively connected—through the bridge element 103—to the second electrical contact 105b with the aid of an electrical conductor designed as a sheet metal strip 105. The second electrical contact 105b is designed as a spring pressure contact 105b and is pressed onto a contact surface (without reference numbers in this case) of the printed circuit board 102 in each case. Otherwise, the previous comments also apply for this exemplary embodiment.

Figure 17:
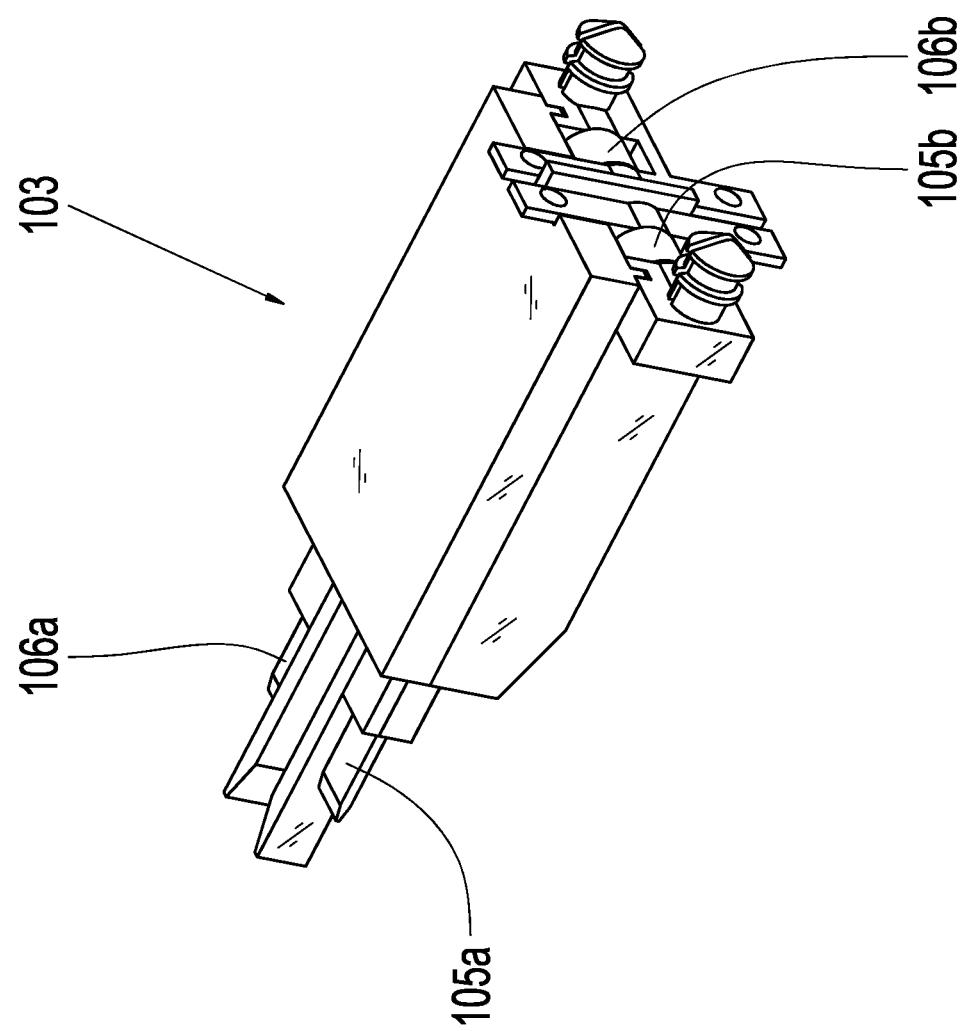
FIG. 17 shows an isometric representation of the bridge element according to FIG. 15.

FIG. 17 shows the bridge element 103 in an isometric representation as a single part, wherein the two first electrical contacts 105a, 106a, designed as contact blades, and the two second electrical contacts 105b, 106b, designed as spring pressure contacts, are clearly apparent. As FIG. 17 shows in a good manner, the first mechanical connecting elements (without reference numbers in this case) for mechanically connecting the actuator 101 to the bridge element 103 are arranged on an inner side of the bridge element 103. The first mechanical connecting elements are therefore arranged between the two electrical contacts 105a, 106a.

Figure 18:
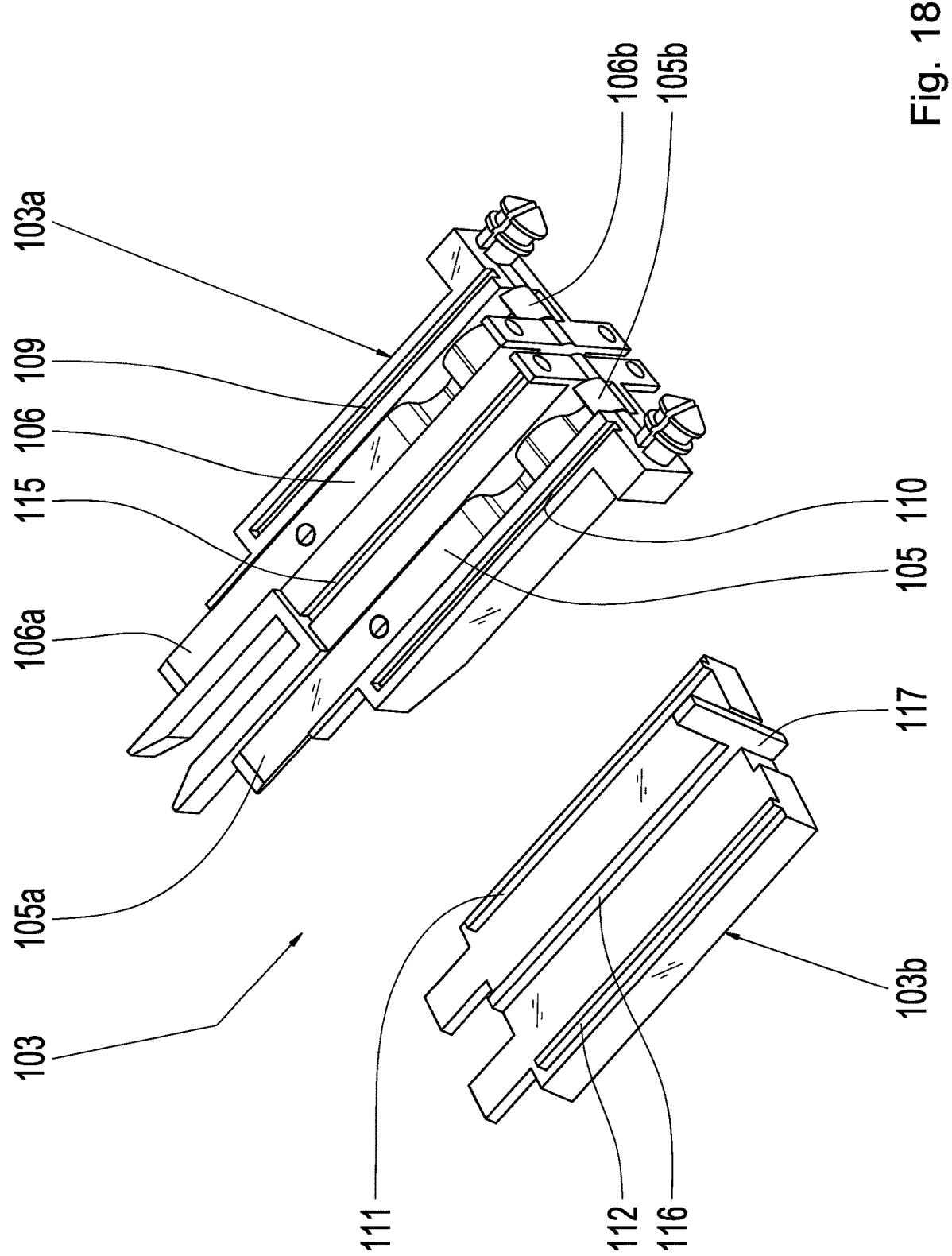
FIG. 18 shows an exploded representation of the bridge element according to FIG. 15.

FIG. 18 shows the bridge element 103 in an exploded representation, separated into a first housing half 103a and a second housing half 103b. The two electrical conductors 105, 106, designed as sheet metal strips, are inserted into the first housing half 103a, and fixed. In order to produce labyrinth sealings, the first housing half 103a includes lateral grooves 109, 110 and a central groove 115, and the second housing half 103b includes lateral ridges 111, 112 and a central longitudinal ridge 116 as well as a transverse ridge 117. The grooves 109, 110, 115 and particular associated ridges 111, 112, 116, 117 correspond to one another. When the two housing halves 103a, 103b are joined, the lateral ridges 111, 112 engage into the lateral grooves 109, 110 and the longitudinal ridge 116 engages into the central groove 115, whereby a debris guard is formed between the electrical conductors 105, 106. Similarly, the outwardly protruding transverse ridge 117 forms a debris guard between the two spring pressure contacts 105b, 106b. The outwardly protruding portion of the transverse ridge 117 can engage, for example, into a corresponding groove of the electronic circuit arrangement 102, in order to form a further improved debris guard.

In principle, it is possible to design the housing (formed from the housing parts 3a, 3b, 63a, 63b, 83a, 83b, 103a, 103b) of the bridge elements 3, 23, 43, 63, 83, 103, which are shown, as one piece. For this purpose, the particular electrical conductors 5, 6, 25, 26, 45, 46, 65, 66, 85, 86, 105, 106, which are provided, can be recessed, in particular, molded, for example, into the particular housing. In particular, the housing is then designed as a plastic injection-molded part, wherein the electrical conductors 5, 6, 25, 26, 45, 46, 65, 66, 85, 86, 105, 106 are injected therein.

When multiple actuators 1, 21, 41, 61, 81,101 are to be connected to a common electronic circuit arrangement 2, 22, 42, 62, 82, 102, several of the bridge elements 3, 23, 43, 63, 83, 103 can be provided, in principle. These can then be preassembled, for example, in a row, on the common circuit arrangement 2, 22, 42, 62, 82, 102. Therefore, with the aid of one single plug-in movement, the circuit arrangement 2, 22, 42, 62, 82, 102 can be simultaneously connected to the multiple actuators 1, 21, 41, 61, 81,101 via the multiple bridge elements 3, 23, 43, 63, 83, 103. Different distances between the actuators 1, 21, 41, 61, 81,101 and the common circuit arrangement 2, 22, 42, 62, 82, 102 can be compensated for with the aid of bridge elements 3, 23, 43, 63, 83, 103 having different lengths. The multiple bridge elements 3, 23, 43, 63, 83, 103 can be mechanically coupled to one another, in particular, via their housing.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 actuator
2 electronic circuit arrangement, printed circuit board
3 bridge element
3a first housing half
3b second housing half
4 contact housing 5 first electrical conductor, first contact spring wire
5a first electrical pressure contact
5b second electrical pressure contact
6 second electrical conductor, second contact spring wire
6a first electrical pressure contact
6b second electrical pressure contact
7 first mechanical connecting element
8 first mechanical connecting element
9 second mechanical connecting element
10 second mechanical connecting element
11 contact pin
12 contact pin
13 recess, indentation
14 recess, indentation
15 groove
16 ridge
21 actuator
22 electronic circuit arrangement, printed circuit board
23 bridge element
24 contact housing
24a abutment
24b abutment
25 first electrical conductor, first contact spring wire
25a first electrical contact
26 second electrical conductor, second contact spring wire
26a first electrical contact
31 contact pin
32 contact pin
33 spring element
34 spring element
41 actuator
42 electronic circuit arrangement, printed circuit board
43 bridge element
45 first electrical conductor, first contact wire
45a first electrical contact
45b second electrical contact
46 second electrical conductor, second contact wire
46a first electrical contact
46b second electrical contact
61 actuator
62 electronic circuit arrangement, printed circuit board
63 bridge element
63a first housing half
63b second housing half
64 contact housing
65 first electrical conductor, sheet metal strip
65a first electrical contact, knife contact
65b second electrical contact
66 second electrical conductor, sheet metal strip
66a first electrical contact, knife contact
66b second electrical contact
71 fork connection contact
75 groove
76 longitudinal ridge
77 transverse ridge
81 actuator
82 electronic circuit arrangement, printed circuit board
83 bridge element
83a first housing half
83b second housing half
84 contact housing
85 first electrical conductor, first contact wire
86 second electrical conductor, second contact wire
90 labyrinth sealing (inner)
91 labyrinth sealing (outer)
92 labyrinth sealing (outer)
101 actuator
102 electronic circuit arrangement, printed circuit board
103 bridge element
103a first housing half
103b second housing half
104 contact housing
105 first electrical conductor, sheet metal strip
105a first electrical contact
105b second electrical contact
106 second electrical conductor, sheet metal strip
106a first electrical contact
106b second electrical contact
107 fork connection contact
109 lateral groove
110 lateral groove
111 lateral ridge
112 lateral ridge
115 central groove
116 longitudinal ridge
117 transverse ridge
a longitudinal and plug-in axis
F1 pressure direction of contacts 5a, 6a
F2 pressure direction of contacts 5b, 6b
X viewing direction

The invention claimed is:

1. A bridge element (3, 23, 43, 63, 83, 103) for establishing an electrical connection between an actuator (1, 21, 41, 61, 81,101) and an electronic circuit arrangement (2, 22, 42, 62, 82, 102) and at least one mechanical connection between the actuator (1, 21, 41, 61, 81, 101) and the bridge element (3, 23, 43, 63, 83, 103) in a transmission control unit of a transmission, comprising:
a housing (3a, 3b, 63a, 63b, 83a, 83b, 103a, 103b);
first electrical contacts (5a, 6a, 25a, 26a, 45a, 46a, 65a, 66a, 105a, 106a) mounted on the housing (3a, 3b, 63a, 63b, 83a, 83b, 103a, 103b);
second electrical contacts (5b, 6b, 25b, 26b, 45b, 46b, 65b, 66b, 105b, 106b) mounted on the housing (3a, 3b, 63a, 63b, 83a, 83b, 103a, 103b) and connected to the first electrical contacts (5a, 6a, 25a, 26a, 45a, 46a, 65a, 66a, 105a, 106a) with electrical conductors (5, 6, 25, 26, 45, 46, 65, 66, 85, 105, 106) for the electrical connection between the actuator (1, 21, 41, 61, 81,101) and the electronic circuit arrangement (2, 22, 42, 62, 82, 102); and
first mechanical connecting elements (7, 8) formed by the housing (3a, 3b, 63a, 63b, 83a, 83b, 103a, 103b), positioned proximate the first electrical contacts (5a, 6a, 25a, 26a, 45a, 46a, 65a, 66a, 105a, 106a), and configured for the mechanical connection between the actuator (1, 21, 41, 61, 81,101) and the bridge element (3, 23, 43, 63, 83, 103),
wherein the first mechanical connecting elements (7, 8) are separate from the first and second electrical contacts, and the electrical conductors (5, 6, 25, 26, 45, 46, 65, 66, 85, 105, 106) are positioned within the housing (3a, 3b, 63a, 63b, 83a, 83b, 103a, 103b).

2. The bridge element (3, 23, 43, 63, 83, 103) of claim 1, further comprising second mechanical connecting elements (9, 10) positioned proximate the second electrical contacts (5b, 6b) and configured for a mechanical connection between the bridge element (3) and the electronic circuit arrangement (2, 22, 2, 62, 82, 102).

3. The bridge element (3, 23, 43, 63, 83, 103) of claim 2, wherein the second mechanical connecting elements (9, 10) are detent or snap-in connectors.

4. The bridge element (3, 23, 43, 63, 83, 103) of claim 1, wherein the first mechanical connecting elements (7, 8) are detent or snap-in connectors.

5. The bridge element (3, 23, 43, 63, 83, 103) of claim 1, wherein the first electrical contacts are spring pressure contacts (5a, 6a, 25a, 26a, 45a, 46a) or knife/fork contacts (65a, 66a, 71, 105a, 107).

6. The bridge element (3, 23, 43, 63, 83, 103) of claim 5, wherein the bridge element (3, 23, 43, 63, 83, 103) has a longitudinal or plug-in axis (a) and a pressure direction (F1) of the first electrical contacts, which are spring pressure contacts (5a, 6a), extends essentially perpendicularly to the longitudinal or plug-in axis (a).

7. The bridge element (3, 23, 43, 63, 83, 103) of claim 1, wherein the second electrical contacts are spring pressure contacts (5b, 6b, 25b, 26b, 105b, 106b) or pin/hole plug contacts (45b, 46b, 65b, 66b).

8. The bridge element (3, 23, 43, 63, 83, 103) of claim 7, wherein the bridge element (3, 23, 43, 63, 83, 103) has a longitudinal or plug-in axis (a), and the pressure direction (F2) of the second electrical contacts, which are spring pressure contacts (5b, 6b, 105b, 106b), extends in the direction of the longitudinal or plug-in axis (a).

9. The bridge element (3, 23, 43, 63, 83, 103) of claim 1, wherein the electronic circuit arrangement (2, 22, 42, 62, 82, 102) is a printed circuit board or a coated stamped grid.

10. The bridge element (3, 23, 43, 63, 83, 103) of claim 1, wherein the first electrical contacts (5a, 6a, 25a, 26a, 45a, 46a), the second electrical contacts (5b, 6b, 25b, 26b, 45b, 46b), and the electrical conductors are contact spring wire (5, 6, 25, 26, 45, 46).

11. The bridge element (3, 23, 43, 63, 83, 103) of claim 1, wherein the first electrical contacts (65a, 66a, 105a, 106a), the second electrical contacts (65b, 66b, 105b, 106b), and the electrical conductors (65, 66, 105, 106) are sheet metal strips.

12. The bridge element (3, 23, 43, 63, 83, 103) of claim 1, wherein a labyrinth sealing (15, 16; 90; 115, 116) is formed between one or more of the electrical conductors (5, 25, 45, 65, 85, 105) on one side of the bridge element (3, 23, 43, 63, 83, 103) and one or more of the electrical conductors (6, 26, 46, 66, 86, 106) on the other side of the bridge element (3, 23, 43, 63, 83, 103).

13. The bridge element (3, 23, 43, 63, 83, 103) of claim 12, wherein the labyrinth sealing comprises a groove (15, 115) and a ridge (16, 116) engaging into the groove (15, 115).

14. The bridge element (3, 23, 43, 63, 83, 103) of claim 1, wherein the housing comprises two mutually joinable housing halves (3a, 3b, 63a, 63b, 83a, 83b, 103a, 103b), and the electrical conductors (5, 6, 25, 26, 45, 46, 65, 66, 85, 86, 105, 106) are accommodated and fixed in or between the two mutually joinable housing halves (3a, 3b, 63a, 63b, 83a, 83b, 103a, 103b).

15. The bridge element (3, 23, 43, 63, 83, 103) of claim 1, wherein the electrical conductors (5, 6, 65, 66, 85, 86, 105, 106) are molded and fixed into the housing or a housing part of the housing (3a, 3b, 63a, 63b, 83a, 83b, 103a, 103b).

16. An arrangement for an electrical connection of an actuator (1, 21, 41, 61, 81,101) comprising first electrical connection contacts (11, 12, 31, 32, 71, 107) and an electronic circuit arrangement (2, 22, 42, 62, 82, 102) comprising second electrical connection contacts in a transmission control unit of a transmission, comprising the bridge element (3, 23, 43, 63, 83, 103) of claim 1.

17. The arrangement as of claim 16, wherein the first electrical connection contacts of the actuator (1, 21, 41, 61, 81, 101) are contact pins (11, 12, 31, 32) and, together with the first electrical contacts (5a, 6a, 107a, 108a, 207a, 208a) of the bridge element (3, 23, 43, 63, 83, 103), form first contactings.

18. The arrangement of claim 16, wherein the second electrical connection contacts of the electronic circuit arrangement (2, 22, 42, 62, 82, 102) are contact surfaces on a surface of the electronic circuit arrangement (2, 22, 42, 62, 82, 102) or hole contacts and form second contactings.

19. The arrangement of claim 16, wherein the electronic circuit arrangement (2, 22, 42, 62, 82, 102) comprises openings for form-locking and/or force-locking accommodation of the second mechanical connecting elements (9, 10) of the bridge element (3, 23, 43, 63, 83, 103).

20. The arrangement of claim 16, wherein the electronic circuit arrangement (2, 22, 42, 62, 82, 102) is pluggable to the bridge element (3, 23, 43, 63, 83, 103), and the electrical connection and the mechanical connection between the actuator (1, 21, 41, 61, 81,101) and the electronic circuit arrangement (2, 22, 42, 62, 82, 102) is simultaneously establishable.

21. The arrangement of claim 16, wherein the actuator (1, 21, 41, 61, 81,101) comprises a contact housing (4, 24, 64, 84, 104), and one or more labyrinth sealings (91, 92) is formed between the electrical conductors (5, 6, 65, 66, 85, 86, 105, 106) of the bridge element (3, 23, 43, 63, 83, 103) via the contact housing (4, 24, 64, 84, 104) and the bridge element (3, 23, 43, 63, 83, 103).

* * * * *